(12) United States Patent
Takabatake et al.

(10) Patent No.: US 12,166,566 B2
(45) Date of Patent: Dec. 10, 2024

(54) COMMUNICATION RELAY APPARATUS, REMOTE CONTROL APPARATUS, SYSTEM, AREA CONTROL METHOD AND PROGRAM

(71) Applicant: SoftBank Corp., Tokyo (JP)

(72) Inventors: Wataru Takabatake, Tokyo (JP); Yohei Shibata, Tokyo (JP); Kenji Hoshino, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/554,206

(22) PCT Filed: Mar. 17, 2022

(86) PCT No.: PCT/JP2022/012444
§ 371 (c)(1),
(2) Date: Oct. 6, 2023

(87) PCT Pub. No.: WO2022/215488
PCT Pub. Date: Oct. 13, 2022

(65) Prior Publication Data
US 2024/0333375 A1    Oct. 3, 2024

(30) Foreign Application Priority Data
Apr. 9, 2021 (JP) .................. 2021-066802

(51) Int. Cl.
*H04B 7/185* (2006.01)
*H04B 7/06* (2006.01)
(Continued)

(52) U.S. Cl.
CPC ....... *H04B 7/18504* (2013.01); *H04B 7/0617* (2013.01); *H04B 7/2041* (2013.01); *H04W 16/28* (2013.01)

(58) Field of Classification Search
CPC ............. H04B 7/18504; H04B 7/0617; H04B 7/2041; H04B 7/0639; H04B 17/309;
(Continued)

(56) References Cited

U.S. PATENT DOCUMENTS

| | | |
|---|---|---|
| 11,171,714 B2 | 11/2021 | Shimazaki |
| 2018/0069610 A1 | 3/2018 | Alexander et al. |

(Continued)

FOREIGN PATENT DOCUMENTS

| | | |
|---|---|---|
| EP | 3 800 923 A1 | 4/2021 |
| JP | 2019-213078 A | 12/2019 |

(Continued)

OTHER PUBLICATIONS

International Preliminary Report on Patentability Dated Oct. 10, 2023, for PCT Application No. PCT/JP2022/012444.
(Continued)

*Primary Examiner* — Fred A Casca
(74) *Attorney, Agent, or Firm* — Muirhead and Saturnelli, LLC

(57) ABSTRACT

An aerial-floating type communication relay apparatus (HAPS) is provided, which can perform a dynamic area control capable of coping with a change of distribution of terminal apparatuses in a service area configured with plural cells formed toward the ground, and that can suppress an increase of time required for area optimization. The aerial-staying type communication relay apparatus (HAPS) estimates positions of plural terminal apparatuses located in a service area, divides plural (L) kinds of antenna parameters of an antenna for service link into plural parameter groups, optimizes the antenna parameters based on estimation results of positions of the plural terminal apparatuses, for each of the parameter groups, and applies, to the antenna for service link, the optimum values of the plural (L) kinds of
(Continued)

antenna parameters after completing the optimization for each of the parameter groups.

18 Claims, 13 Drawing Sheets

(51) Int. Cl.
*H04B 7/204* (2006.01)
*H04W 16/28* (2009.01)

(58) Field of Classification Search
CPC ... H04B 7/0691; H04B 17/373; H04W 16/28; G01S 5/02523; G01S 5/02524; G01S 13/42; G01S 13/86
See application file for complete search history.

(56) References Cited

U.S. PATENT DOCUMENTS

2018/0227928 A1* 8/2018 Kim ............... H04L 5/0023
2021/0226691 A1* 7/2021 Shimazaki ............ H04W 16/08

FOREIGN PATENT DOCUMENTS

| JP | 2019-213079 A | 12/2019 |
|---|---|---|
| WO | WO 2019/235324 A1 | 12/2019 |
| WO | WO 2020/095056 A1 | 5/2020 |
| WO | WO 2020/152475 A1 | 7/2020 |

OTHER PUBLICATIONS

Yohei Shibata, et al., "System Design of Gigabit HAPS Mobile Communications", IEEE Access, vol. 8, pp. 157995-158007, 2020.
Yohei Shibata, et al., "Dynamic Cell Optimization for HAPS Multi-cell Configuration Considering User Distribution", IEICE Technical Report, vol. 120, No. 322, RCS2020-185, pp. 170-175, Jan. 2021.
International Search Report and Written Opinion Dated for PCT Application No. PCT/JP2022/012444, May 31, 2022.
Yohei Shibata, et al., "Dynamic Cell Optimization Considering User Distribution for HAPS", Proceedings of the 2021 IEICE General Conference, Communications 1, p. 373, Feb. 23, 2021.
Yohei Shibata, et al., "Dynamic Cell Control Considering User Distribution in HAPS Mobile Communications", Proceedings of the 2021 IEICE Society Conference, Communications 1, p. 237, Sep. 1, 2020.
Notice for Reasons of Refusal for Japanese Patent Application No. 2021-066802, Dated May 23, 2022.
Decision to Grant Patent for Japanese Application No. 2021-066802, dated Sep. 29, 2022.
European Search Report, Dated Oct. 22, 2024.

* cited by examiner

AFTER APPLICATION

BEFORE APPLICATION

COMMUNICATION RELAY APPARATUS, REMOTE CONTROL APPARATUS, SYSTEM, AREA CONTROL METHOD AND PROGRAM

TECHNICAL FIELD

The present invention relates to an optimization of a service area configured with cells formed toward the ground by an aerial-staying type communication relay apparatus.

BACKGROUND ART

There is conventionally known a method for performing an area optimization that optimizes antenna parameters of service link so that desired communication quality (for example, throughput) can be obtained in an entire service area (hereinafter, also simply referred to as "area") formed on the ground by a communication relay apparatus such as a high-altitude platform station (HAPS) (also referred to as "high altitude pseudo satellite") that can float and stay in an airspace.

For example, Non-Patent Literature 1 discloses a method for performing an area optimization by assuming that the distribution of user apparatuses (hereinafter also referred to as "UEs") as terminal apparatuses in an area is a uniform distribution. Non-Patent Literature 2 discloses a method for performing an optimization for each cell so that desired communication quality (for example, throughput) can be obtained in the entire area when the area is configured with plural cells.

CITATION LIST

Non-Patent Literature

Non-Patent Literature 1: Y. Shibata, N. Kanazawa, M. Konishi, K. Hoshino, Y. Ohta and A. Nagate, "System Design of Gigabit HAPS Mobile Communications," in IEEE Access, vol. 8, pp. 157995-158007, 2020.

Non-Patent Literature 2: Yohei Shibata. Wataru Takabatake, Kenji Hoshino, Atsushi Nagate. "HAPS dynamic cell control algorithm considering user distribution in plural-cell configuration", IEICE Technical Report, vol. 120, no. 322, RCS2020-185, pp. 170-175, January 2021.

SUMMARY OF INVENTION

Technical Problem

In the method of Non-Patent Literature 2, although it can adapt to a non-uniform UE distribution in the area, there is a problem that the calculation becomes exponentially complicated, the amount of calculation increases and the time required for area optimization increases because the optimization is performed for each cell.

Solution to Problem

A communication relay apparatus according to an aspect of the present invention is an aerial-staying type communication relay apparatus having a relay communication station for relaying radio communication of terminal apparatuses located in plural (N) cells formed toward a service area on the ground and an antenna for service link. The communication relay apparatus comprises position estimation means for estimating positions of plural terminal apparatuses located in the service area, parameter optimization means for dividing plural (L) kinds of antenna parameters of the antenna for service link into plural parameter groups, and optimizing the antenna parameters based on estimation results of positions of the plural terminal apparatuses, for each of the parameter groups, and parameter application means for applying, to the antenna for service link, optimum values of the plural (L) kinds of antenna parameters after completing the optimization for each of the parameter groups.

A remote control apparatus according to another aspect of the present invention is a remote control apparatus capable of communicating with an aerial-staying type communication relay apparatus having a relay communication station for relaying radio communication of terminal apparatuses located in plural (N) cells formed toward a service area on the ground and an antenna for service link. The remote control apparatus comprises position estimation means for estimating positions of plural terminal apparatuses located in the service are, parameter optimization means for dividing plural (L) kinds of antenna parameters of the antenna for service link into plural parameter groups, and optimizing the antenna parameters based on estimation results of positions of the plural terminal apparatuses, for each of the parameter groups, and parameter transmission means for transmitting, to the communication relay apparatus, optimum values of the plural (L) kinds of antenna parameters after completing the optimization for each of the parameter groups.

In the foregoing communication relay apparatus and the foregoing remote control apparatus, the parameter optimization means may divide the plural (L) kinds of antenna parameters of the antenna for service link into a first parameter group including horizontal beam directions of plural (N) beams forming the plural (N) cells and a second parameter group including one or more other kinds of antenna parameters other than the horizontal beam directions of the plural (N) beams.

In the foregoing communication relay apparatus and the foregoing remote control apparatus, the parameter optimization means may determine the horizontal beam directions of the plural (N) beams belonging to the first parameter group by a predetermined conditional branching based on the estimation results of the positions of the plural terminal apparatuses, and may determine optimum values of the one or more other kinds of antenna parameters belonging to the second parameter group based on the estimation results of the positions of the plural terminal apparatuses by a search-based algorithm.

In the foregoing communication relay apparatus and the foregoing remote control apparatus, plural kinds of antenna parameters belonging to the second parameter group may include a tilt angle, a horizontal beam width and a vertical beam width of each of the plural (N) beams.

In the foregoing communication relay apparatus and the foregoing remote control apparatus, the search-based algorithm may be a genetic algorithm.

In the foregoing communication relay apparatus and the foregoing remote control apparatus, the parameter optimization means may determine the horizontal beam directions of the plural (N) beams so that p (<N) beams among the plural (N) beams are disposed in the horizontal direction where the cluster of the terminal apparatus is occurred, and remaining N-p beams are disposed so that spatial intervals in an angular range of the horizontal direction excluding the p beams become equal to each other.

In the foregoing communication relay apparatus and the foregoing remote control apparatus, the parameter optimization means may perform the parameter optimization repeatedly plural times (T times).

In the foregoing communication relay apparatus and the foregoing remote control apparatus, these apparatuses may perform the position estimation for the plural terminal apparatuses, the optimization for the antenna parameters and the application of the optimum values of the antenna parameters to the antenna for service link, periodically or when an amount of change in the distribution of the terminal apparatuses in the service area becomes larger than a predetermined amount of change.

In the foregoing communication relay apparatus, the relay communication station may comprise a base-station processing section that is connected to a mobile communication network via a feeder link between the relay communication station and a gateway station on the ground and performs a baseband process.

In the foregoing communication relay apparatus, the relay communication station may comprise a repeater section that is connected to a base station apparatus via a feeder link between the relay communication station and a gateway station on the ground and performs a radio relay.

A system according to yet another aspect of the present invention comprises any one of the remote control apparatuses, and the aerial-staying type communication relay apparatus.

A method according to yet another aspect of the present invention is an area control method for a service area configured with plural (N) cells formed toward the ground from an aerial-staying type communication relay apparatus. The area control method includes estimating positions of plural terminal apparatuses located in the service area, dividing plural (L) kinds of antenna parameters of the antenna for service link into plural parameter groups, and optimizing the antenna parameters based on estimation results of positions of the plural terminal apparatuses, for each of the parameter groups, and applying, to the antenna for service link, optimum values of the plural (L) kinds of antenna parameters after completing the optimization for each of the parameter groups.

A program according to yet another aspect of the present invention is a program executed by a computer or processor provided in an aerial-staying type communication relay apparatus having a relay communication station for relaying radio communication of terminal apparatuses located in plural (N) cells formed toward a service area on the ground and an antenna for service link. The program includes a program code for estimating positions of plural terminal apparatuses located in the service area, a program code for dividing plural (L) kinds of antenna parameters of the antenna for service link into plural parameter groups, and optimizing the antenna parameters based on estimation results of positions of the plural terminal apparatuses, for each of the parameter groups, and a program code for applying, to the antenna for service link, optimum values of the plural (L) kinds of antenna parameters after completing the optimization for each of the parameter groups.

A program according to yet another aspect of the present invention is a program executed by a computer or processor provided in a remote control apparatus capable of communicating with an aerial-staying type communication relay apparatus having a relay communication station for relaying radio communication of terminal apparatuses located in plural (N) cells formed toward a service area on the ground and an antenna for service link. The program includes a program code for estimating positions of plural terminal apparatuses located in the service area, a program code for dividing plural (L) kinds of antenna parameters of the antenna for service link into plural parameter groups, and optimizing the antenna parameters based on estimation results of positions of the plural terminal apparatuses, for each of the parameter groups, and a program code for transmitting, to the communication relay apparatus, optimum values of the plural (L) kinds of antenna parameters after completing the optimization for each of the parameter groups.

Advantageous Effects of Invention

According to the present invention, it is possible to perform a dynamic area control capable of coping with a change of distribution of terminal apparatuses in a service area configured with plural cells formed from an aerial-floating type communication relay apparatus toward the ground, and to suppress an increase of time required for the area optimization.

DESCRIPTION OF EMBODIMENTS

Hereinafter, embodiments of the present invention are described with reference to the drawings.

A system according to an embodiment described herein is a dynamic-area control system capable of coping with a change of user distribution while suppressing an increase of time required for area optimization, by estimating a position of user's UE (terminal apparatus) in a target area where a HAPS relays a communication, separating plural kinds of antenna parameters into antenna parameters in a horizontal beam direction and other directions, and determining antenna parameters in the horizontal beam direction on a rule-based and searching for an optimal solution for other antenna parameters using a predetermined algorithm such as a genetic algorithm, based on the estimation results of the UE position, in a HAPS mobile communication system configured with multiple cells.

Figure 1:
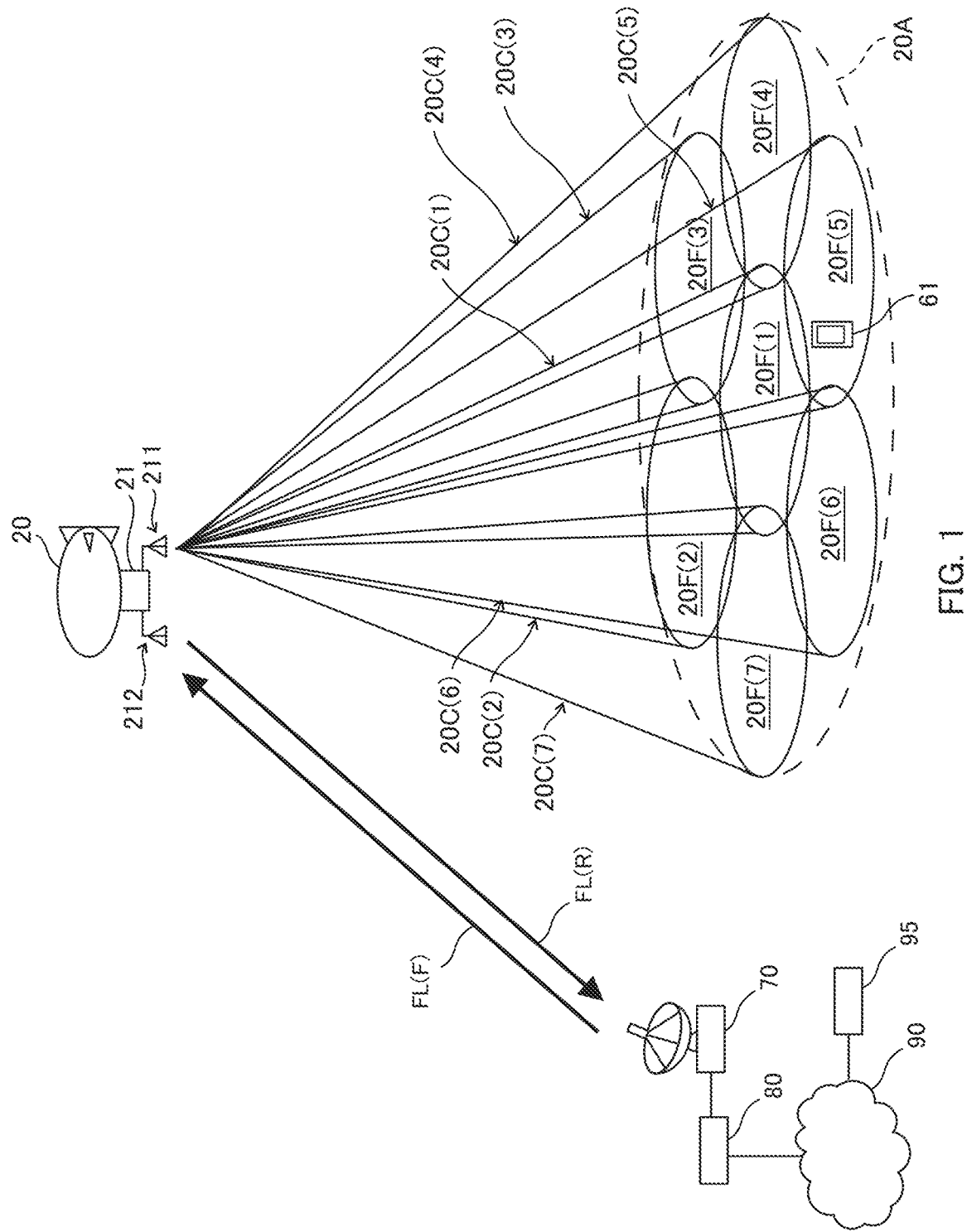
FIG. 1 is an illustration showing an example of a configuration of a communication system according to an embodiment.

FIG. 1 is an illustration showing an example of a configuration of a communication system according to an embodiment of the present invention. The communication system according to the present embodiment is suitable for realizing a three-dimensional network for mobile communication of fifth-generation or subsequent-generation, which supports simultaneous connection to a large number of terminal apparatuses (hereinafter referred to as "UEs"), low delay, and the like. The mobile communication standards applicable to communication systems, radio relay stations, base stations, repeaters and UEs disclosed in the present specification include the fifth-generation mobile communication standards and the next generation mobile communication standards after the fifth-generation.

As shown in FIG. 1, the communication system is provided with a High Altitude Platform Station (HAPS) (also called "high altitude pseudo satellite" or "stratified platform") 20 as an aerial-floating type communication relay apparatus (radio relay apparatus). The HAPS 20 is located in an airspace at a predetermined altitude and forms a three-dimensional cell (three-dimensional area) in a cell-formation target airspace at a predetermined altitude. The HAPS 20 is an airship as a floating object that is controlled by autonomous control or external control so as to float or fly and be located in an airspace (floating airspace) with high altitude of 100 [km] or less from the ground level or the sea level, and a relay communication station 21 is mounted on the airship.

The airspace in which the HAPS 20 is located is, for example, a stratospheric airspace with altitude of 11 [km] or more and 50 [km] or less on the ground (or on the water such as the sea or lake). The airspace may be an airspace with altitude of 15 [km] or more and 25 [km] or less where weather conditions are relatively stable, and may be an airspace with altitude of about 20 [km] in particular.

The cell-formation target airspace, where is a target airspace for forming a three-dimensional cell with one or two or more HAPSs in the communication system of the present embodiment, is an airspace in a predetermined altitude range (for example, altitude range of 50 [m] or more and 1000 [m] or less) located between the airspace where the HAPS 20 is located and a cell formation area near the ground level covered by a base station (for example, eNodeB in the LTE or gNodeB in the next-generation) such as a conventional macro-cell base station.

It is noted that, the cell-formation target airspace, where the three-dimensional cell of the present embodiment is formed, may be an upper airspace over seas, rivers or lakes. Further, the three-dimensional cell formed by the HAPS 20 may be formed so as to reach the ground level or the sea level, so as to be able to also communicate with a UE 61 located on the ground or on the sea.

The relay communication station 21 of the HAPS 20 forms plural beams for wirelessly communicating with the UE 61 that is a mobile station toward the ground, by an antenna for service link (hereinafter referred to as "SL antenna") 211. The SL antenna 211 is, for example, a single array antenna or plural array antennas capable of forming plural beams toward the ground, in which plural antenna elements are disposed two-dimensionally or three-dimensionally.

The UE 61 may be a communication terminal module incorporated in a drone that is an aircraft such as a small helicopter capable of remotely steering, or may be a user apparatus used by a user in an airplane. The area through which the beam passes in the cell-formation target airspace is a three-dimensional cell. Plural beams adjacent to each other in the cell-formation target airspace may partially overlap.

The relay communication station 21 of the HAPS 20 is, for example, a base station that wirelessly communicates with a gateway station (also referred to as a "feeder station") 70 as a relay station connected to a core network on the ground (or on the sea) side, or a slave repeater that wirelessly communicates with a feeder station (master repeater) 70 as a relay station connected to a base station apparatus on the ground (or on the sea) side. In the following embodiments, a case is described, in which the relay communication station 21 is a slave repeater.

The relay communication station 21 of the HAPS 20 is connected to a core network of a mobile communication network 90 via the gateway station (hereinafter referred to as "GW station") 70 capable of performing a radio communication by an antenna for feeder link (hereinafter referred to as "FL antenna") 212, which is disposed on the ground or on the sea, and a base station apparatus 80, and is further connected to the Internet that is an external communication network. The FL antenna 212 may be, for example, a single array antenna or plural array antennas in which plural antenna elements are disposed two-dimensionally or three-dimensionally. The feeder link FL(F) in the figure is a forward link from the GW station 70 toward the UE 61 via the HAPS 20, and the feeder link FL(R) is a reverse link from the UE 61 toward the GW station 70 via the HAPS 20.

The HAPS 20 may autonomously control its own floating movement (flight) and a process in the relay communication station 21 by executing a control program by a control section configured with a computer or a processor, etc. built in the inside. For example, the HAPS 20 can autonomously perform the dynamic area control described later. The HAPS 20 may obtain its own current position information (for example, GPS position information), position control information (for example, flight schedule information) stored in advance, position information on another HAPS located in a peripheral space, or the like, and may autonomously control the floating movement (flight) and the process in the relay communication station 21 based on these kinds of information.

The control section of HAPS 20 also functions as means for the following C1 to C3 by executing the control program.

C1. Position estimation means for estimating positions of plural UEs 61 located in a service area 20A.

C2. Parameter optimization means for dividing the service area 20A into plural (M) subareas 20S including plural cells 20C and optimizing plural (L) kinds of antenna parameters of the SL antenna 211 for each of the subareas 20S based on the estimation results of the positions of plural UEs 61.

C3. Parameter application means for applying, to the SL antenna 211, optimum values of the plural (L) kinds of antenna parameters after the optimization for each of the subareas 20S is completed for all of the plural (M) subareas 20S.

Herein, the positions of the plural UEs 61 can be estimated using, for example, GNSS position information or MR (measurement report) fed back from each UE 61.

The floating movement (flight) of the HAPS 20 and the process at the relay communication station 21 may be controlled by a remote control apparatus 95 provided in a communication center of the mobile communication network 90 or the like. The remote control apparatus 95 can be configured with, for example, a computer apparatus such as a PC, a server, or the like. The HAPS 20 may incorporate a communication terminal apparatus for control (for example, a mobile communication module) so that it can receive control information from the remote control apparatus 95 and transmit various kinds of information such as monitoring information to the remote control apparatus 95, and may be assigned terminal identification information (for example, IP address, telephone number, etc.) so that it can be identified from the remote control apparatus 95. The MAC address of the communication interface may be used to identify the communication terminal apparatus for control.

The remote control apparatus 95 can perform a dynamic area control described below by cooperating with the HAPS 20, for example.

The HAPS 20 may transmit information relating to floating movements (flights) of the own HAPS or surrounding HAPS and the process in the relay communication station 21, and monitoring information such as position information of the HAPS 20, status information of the HAPS 20 and observation data obtained by various kinds of sensors, to a predetermined destination such as the remote control apparatus 95, etc. The control information may include target-flight route information of the HAPS. The monitoring information may include at least one of information on current position, flight-route history information, velocity relative to the air, velocity relative to the ground and propulsion direction of the HAPS 20, wind velocity and wind direction of airflow around the HAPS 20, and atmospheric pressure and temperature around the HAPS 20.

Duplex methods of uplink and downlink for radio communication with the relay communication station 21 and the UE 61 are not limited to specific methods, and may be, for example, a time division duplex method (Time Division Duplex: TDD) or a frequency division duplex method (Frequency Division Duplex: FDD). An access method for radio communication with the relay communication station 21 and the UE 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time with the same frequency, and may be an MU-MIMO (Multi-User MIMO) technology in which one base station transmits signals to plural different communication terminal apparatuses on the same time with the same frequency or plural different base stations transmit signals to one terminal apparatus on the same time with the same frequency.

In the following embodiments, although a case is illustrated and described, in which a communication relay apparatus having the relay communication station 21 that wirelessly communicates with the UE 61 is an unmanned-airship type HAPS 20, the communication relay apparatus may be a solar plane, a drone (unmanned aerial vehicle), or other type of flying object with the relay communication station 21 mounted thereon. The following embodiments can be similarly applied to other aerial-floating types of communication relay apparatuses other than the HAPS.

In the HAPS mobile communication system of the configuration described above, for example, a signal from the base station apparatus 80 is relayed by the GW station 70 and the HAPS 20, and communication services can be provided to the UE 61 on the ground. The present communication system performs an area optimization for optimizing the antenna parameters of the SL antenna 211 so that a desired communication quality (for example, throughput) can be obtained in the entire service area (hereinafter also simply referred to as "area") 20A configured with plural cells 20C(1) to 20C(7) formed toward the ground by the HAPS 20.

The distribution of UEs in the foregoing area varies according to location and time. For example, at the event of a disaster, there is a possibility that UEs are concentrated in a part in the area and a sudden increase in traffic occurs. In order to cope with such non-uniform UE distribution in the area that changes depending on location and time, the dynamic area control for dynamically performing the foregoing area optimization for each of the cells forming the area 20A is performed in the present embodiment.

Figure 2P:
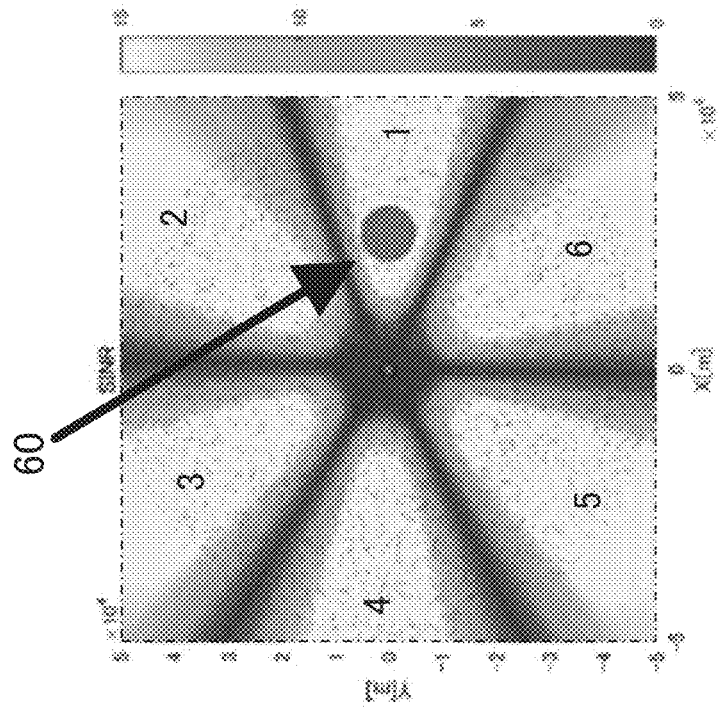
FIG. 2A is an illustration of cell placement before and after applying an area optimization for each cell in a service area configured with six cells.
FIG. 2B is an illustration of cell placement before and after applying an area optimization for each cell in a service area configured with six cells.
Figure 2A:
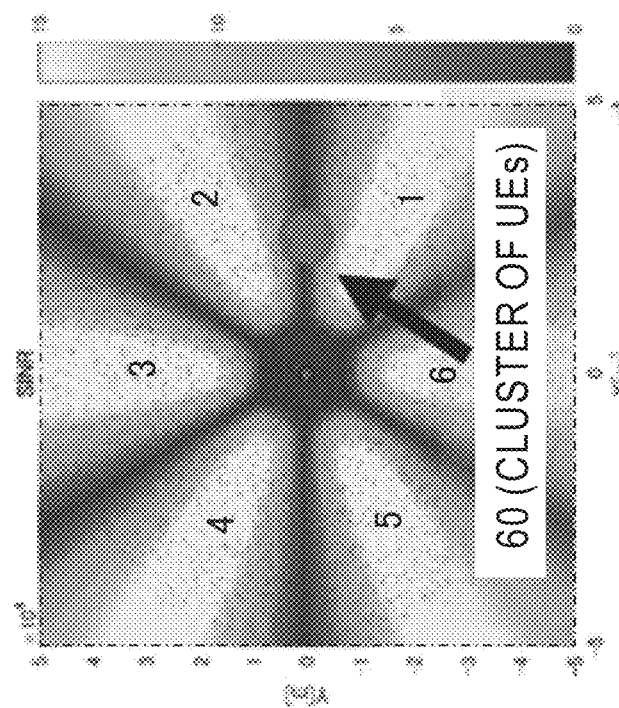

Each of FIG. 2A and FIG. 2B is an illustration of cell placement before and after applying the area optimization in a service area configured with six cells. Six sections with high brightness in FIG. 2A and FIG. 2B are respectively the positions of the cells, and each of numeric characters in these sections is number for identifying each cell. In FIG. 2A and FIG. 2B, the positions of UEs in the area are indicated by small dots. In the examples of FIG. 2A and FIG. 2B, a UE high-density section (hereinafter referred to as "UE cluster") 60 is generated in one place in the area, in which the UE density is partially high. Although the UE cluster 60 indicated by an arrow in the figure does not correspond to the cell before applying the area optimization in FIG. 2A, the cell 1 corresponds to the UE high-density section 60 after applying the area optimization in FIG. 2B.

By performing the area optimization in this way, the positions of cells can be corresponded to the non-uniform UE distribution in the area. However, in case of performing the area optimization, in which plural antenna parameters of the SL antenna 211 are optimized for each cell, due to an increase in the number of cells in the area and the number of antenna parameters, the calculations for optimizing the antenna parameters for each cell becomes exponentially more complex, the amount of calculation increases and the time required for area optimization increases.

Figure 3:
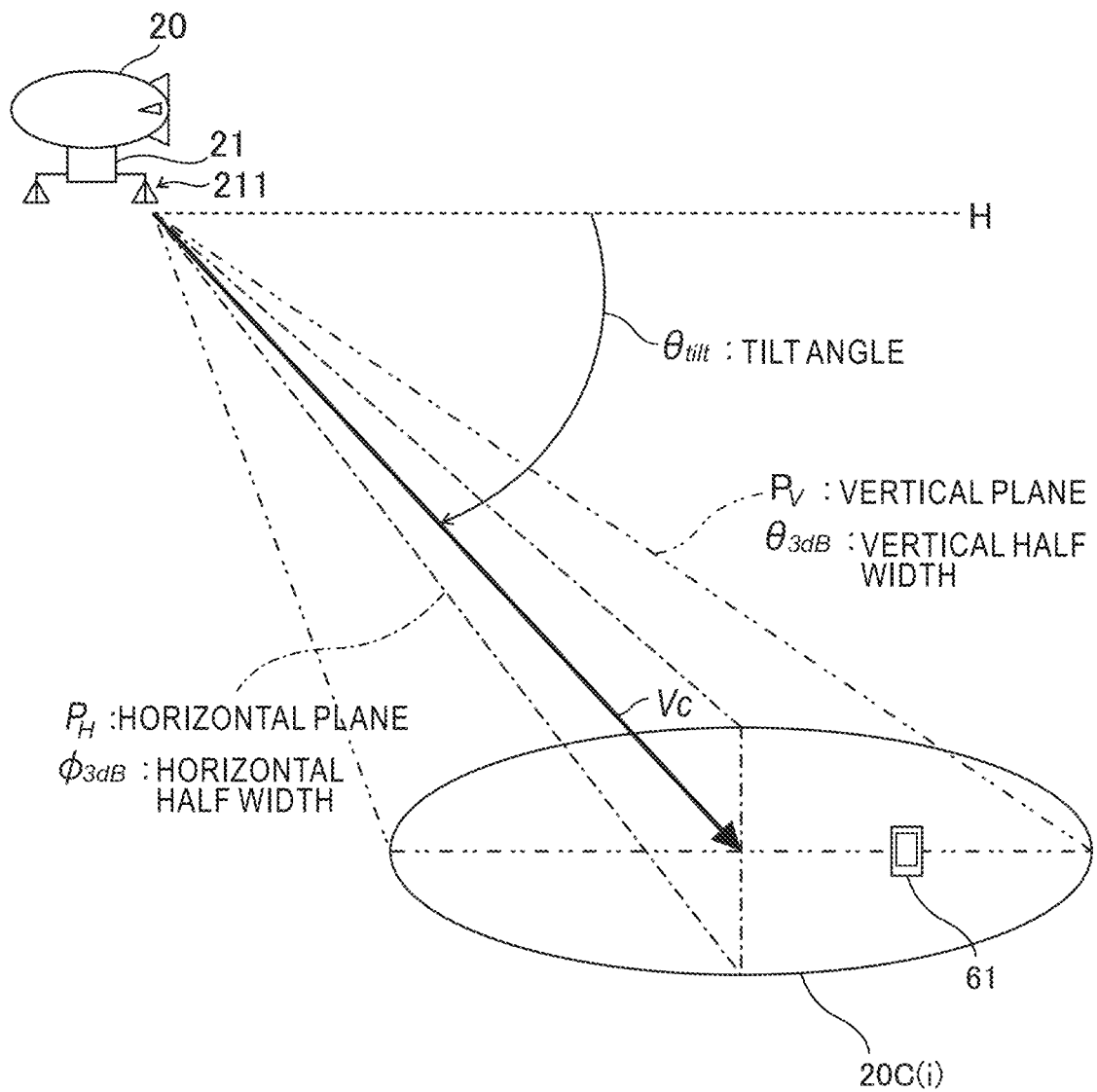
FIG. 3 is an illustration of an antenna tilt angle, a vertical half width, and a horizontal half width as antenna parameters used for the area optimization.

For example, in area optimization of an area configured with N cells, as plural (L) kinds of antenna parameters for an arbitrary i-th cell i in the area, the following four kinds of antenna parameters A to D are defined and used.
 A. Tilt angle $\theta_{tilt,i}$
 B. Vertical value width $\theta_{3dB,i}$
 C. Horizontal value width $\varphi_{3dB,i}$
 D. Cell horizontal orientation direction $\omega_i$ As shown in FIG. 3, the tilt angle $\theta_{tilt,i}$ is an angle from the horizontal direction H of the vector Vc from the SL antenna 211 of the HAPS 20 toward the center of the target i-th cell 20(i). The vertical value width $\theta_{3dB,i}$ is an angular width between two points at which the gain of the beam is reduced by 3 dB from the maximum gain at the center of the main beam in the vertical plane Pv including the vector Vc toward the center of the i-th cell 20(i). The horizontal half-width $\varphi_{3dB,i}$ is an angular width between two points at which the gain of the beam is reduced by 3 dB from the maximum gain at the center of the main beam in the horizontal plane $P_H$ including the vector Vc toward the center of the i-th cell 20(i).

Figure 4:
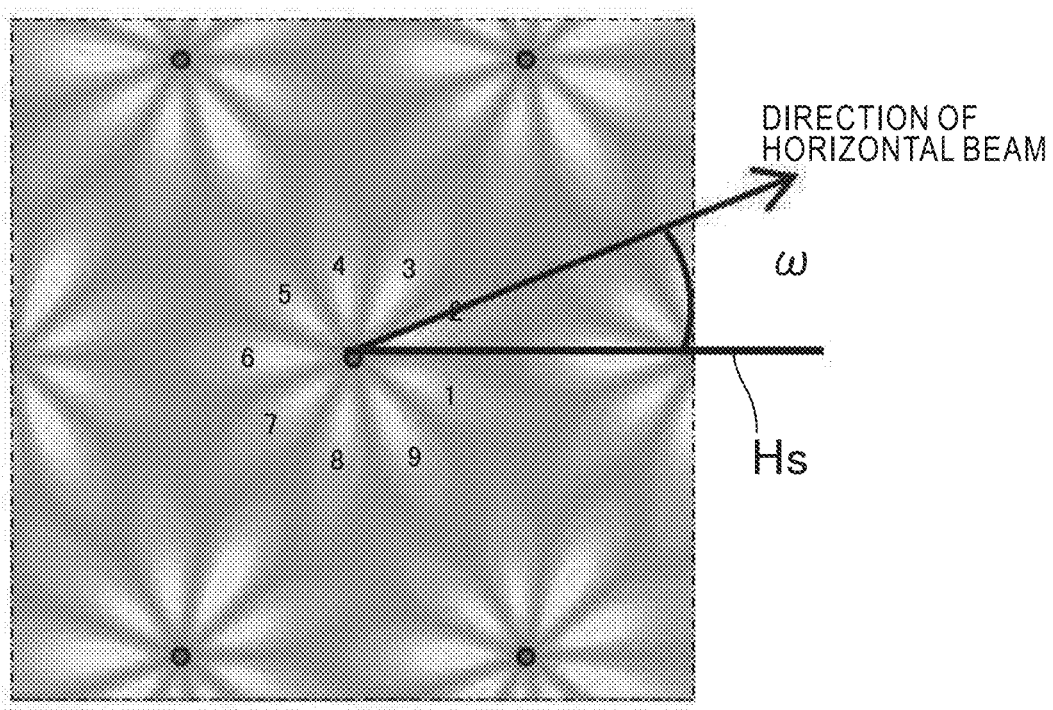
FIG. 4 is an illustration of horizontal directions for subareas used for the area optimization.

As shown in FIG. 4, the i-th cell horizontal orientation direction $\omega_i$ is an angle in a direction passing through the center of the target cell (cell 2 in the illustrated example) from the reference point with reference to the predetermined reference horizontal direction Hs, in a horizontal plane including the position of the SL antenna 211 of the HAPS 20 (center position in the figure) as a reference point.

Figure 5:
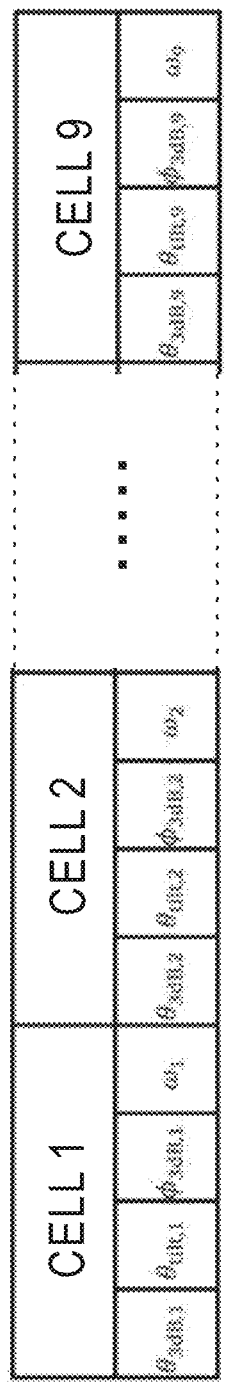
FIG. 5 is an illustration showing a list of antenna parameters to be optimized, which are applied to each cell.

In the case of four kinds of antenna parameters A to D, assuming that the number of cells is N, the total number of antenna parameters that are targeted for optimization is 4N. For example, in case that the number of cells is nine, the total number of antenna parameters that are targeted for optimization is thirty-six as shown in FIG. 5. Assuming that the number of candidates for each antenna parameter is M, the number of combinations of the candidates of antenna parameters to be optimized is $M^{4N}$. In this way, the number of combinations of the candidates of the antenna parameters to be optimized increases exponentially as the number of cells N increases, and the calculations become exponentially more complex because the optimization is performed for each cell. Therefore, the amount of calculation for the area optimization increases, and the time required for the area optimization increases.

Therefore, in the present embodiment, by dividing plural (L) kinds (four kinds in the above example) of antenna parameters into plural parameter groups and optimizing them, the amount of calculation for the area optimization is reduced and the increase in time required for the area optimization is suppressed.

For example, in case that the number of cells in the area is N and the number of candidates for each of the four antenna parameters described above is M, if trying to optimize the four antenna parameters simultaneously, the number of combinations of the candidates of antenna parameters to be optimized is $M^{4N}$ as described above. On the other hand, for example, in case of optimizing in two stages by dividing into one antenna parameter and three antenna parameters, the number of combinations of the candidates of antenna parameters to be optimized are $M^N$ in the first stage and $M^{3N}$ in the second stage, respectively, and the total number becomes $M^N+M^{3N}$ which is much smaller than $M^{4N}$ in the case of simultaneous optimization of the four antenna parameters. Further, in case of optimizing in two stages by dividing into 2 antenna parameters and 2 antenna parameters, the number of combinations of the candidates of antenna parameters to be optimized are $M^{2N}$ in both the first stage and the second stage, and the total number becomes $2 \times M^{2N}$, which is much smaller than $M^{4N}$ in the case of simultaneous optimization of the four antenna parameters.

Furthermore, in the present embodiment, after dividing the plural (L) kinds (four kinds in the above example) of antenna parameters into plural parameter groups, as a method for optimizing the antenna parameters, a search-based method for searching for the optimum solution of antenna parameters using a predetermined algorithm such as a genetic algorithm and a rule-based method for determining antenna parameter values based on predetermined conditions are used in combination as appropriate. As a result, the amount of calculation for the area optimization can be reduced, and a solution close to the optimum solution can be obtained.

In the following embodiments, as an example of applying the separation of the plural antenna parameters and the combination of the search-based method and the rule-based method, an example is described, in which the first-stage optimization process is performed by the rule base for the horizontal oriental direction (horizontal beam direction) of each cell belonging to the first parameter group, and then the second-stage optimization process is performed by the search method for the other antenna parameters belonging to the second parameter group.

In the first-stage optimization process, the horizontal beam direction is determined by a conditional branching based on the UE distribution, for example, in the following procedures (1-1) and (1-2).
 (1-1) An occurrence position of the UE cluster is estimated based on the histogram of UEs for each angle in the horizontal direction, and the beam is preferentially directed to the UE cluster. Throughput can be improved by directing the beam to the UE cluster.
 (1-2) The remaining beams are disposed one by one so that spatial intervals between the beams are approximately equal. As a result, it is possible to prevent the deterioration of the learning efficiency (especially for beam width) due to beam interference in the next search stage of the second stage.

In the second-stage optimization process, optimal solutions for parameters other than the horizontal beam direction are searched with the search-based method. In this second stage, since the horizontal beam direction has already been determined, the number of antenna parameters searched in the search-based method can be reduced from 4N to 3N.

Since the horizontal beam direction is determined by the rule base, in case that the number of candidates for each of the antenna parameters is M and the number of cells is N, the number of combinations of the candidates of antenna parameters to be calculated during the area control becomes $1+M^{3N}$, which is much smaller than $M^{4N}$ in the case of the simultaneous optimization of four antenna parameters.

Figure 6:
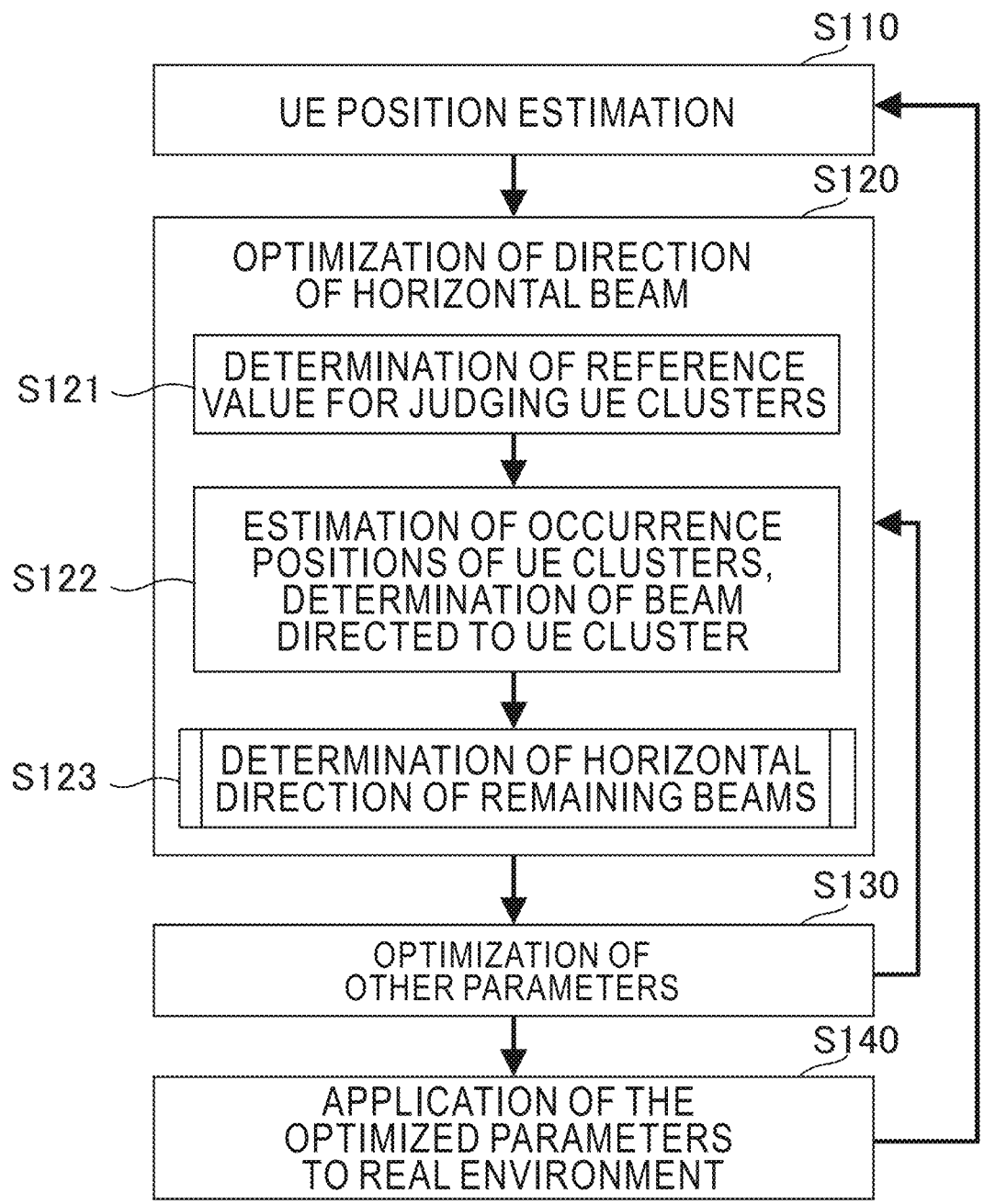
FIG. 6 is a flowchart showing an example of dynamic area control according to an embodiment.
Figure 7:
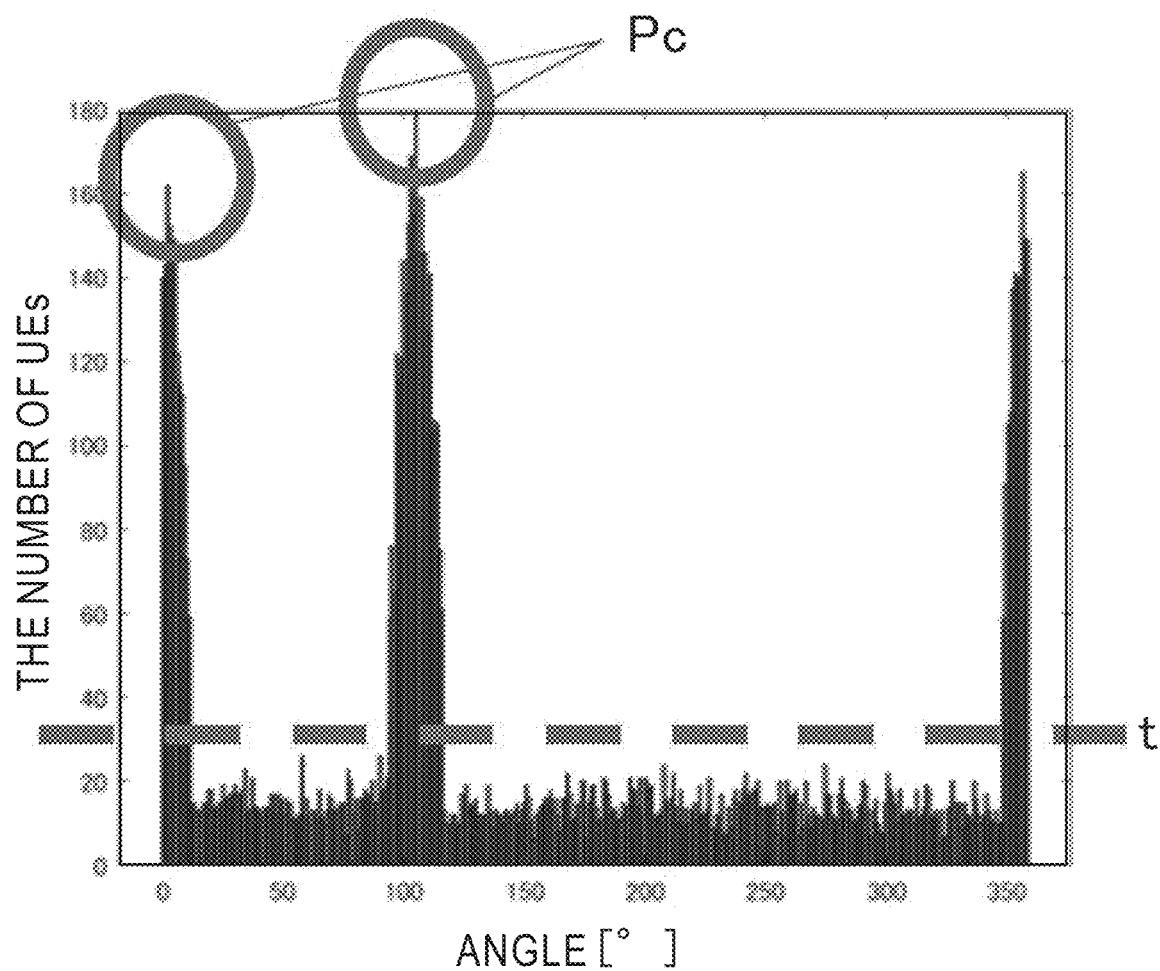
FIG. 7 is an illustration showing occurrence positions of UE clusters in a histogram of UEs with respect to angles in the horizontal direction.
Figure 8:
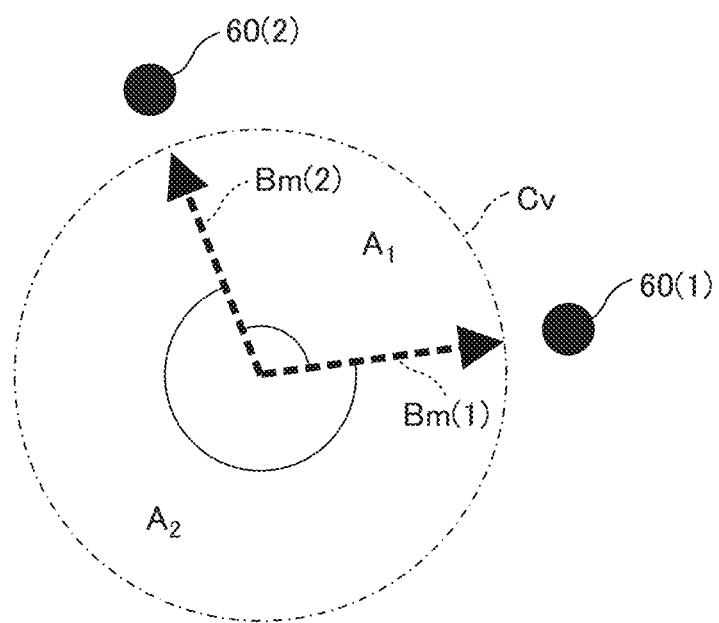
FIG. 8 is an illustration showing an example of beams directed to occurrence positions of UE clusters.

FIG. 6 is a flowchart showing an example of dynamic area control in the HAPS 20 according to the embodiment. FIG. 7 is an illustration showing occurrence positions of UE clusters in a histogram of UEs with respect to angles in the horizontal direction. FIG. 8 is an illustration showing an example of beams directed to the occurrence positions of UE clusters.

In FIG. 6, the dynamic area control includes a UE position-estimation step (S110), a horizontal-beam direction optimization step (S120), an optimization step for other parameters (S130), and a parameter application step for applying the optimized parameters to the real environment (S140).

In the UE position-estimation step (S110), the position of each UE 61 in the area 20A is estimated by some method, and the estimation result (for example, coordinate data of the position of each UE 61) is outputted. The position of each UE 61 can be estimated using, for example, GNSS position information or an MR (Measurement Report) fed back from each UE 61.

Next, in the horizontal-beam direction optimization step (S120), the estimation result of the position of each UE 61 outputted in the UE position-estimation step (S110) (for example, the coordinate data of the position of each UE 61) is inputted, and among the N beams formed by the SL antenna 211, p beams are disposed to face the UE cluster direction, and the remaining N-p beams are disposed so that the angular intervals between the beams are approximately equal.

The horizontal-beam direction optimization step (S120) may be performed, for example, in the following procedure.

First, as shown in FIG. 7, a histogram of the number of UEs with an interval of 1° is generated, and a threshold value t is determined as a reference value for judging UE clusters with much number of UEs, from the distribution of the total number of UEs (S121).

Next, the angle, at which the number of UEs is greater than or equal to the threshold value t in the angle range (360°/N) of each cell and is maximum in that angle range, is estimated as the occurrence positions (p positions) of UE clusters, and p beams directed to the respective p (p≥1) UE clusters are determined (S122). In the example of FIG. 8, two beams Bm(1) and Bm(2) respectively directed to the two UE clusters 60(1) and 60(2) are determined. It is noted that the dashed-dotted circle Cv in FIG. 8 is a virtual circle used for the beam determination, and the area in this virtual circle is divided into two areas A1 and A2 by the beams Bm(1) and Bm(2) determined above.

Next, the horizontal directions of the remaining N-p beams among the N beams formed by the SL antenna 211 are determined (S123).

Next, after determining the horizontal directions for all of the N beams formed by the SL antenna 211, remaining other antenna parameters other than the horizontal beam direction are optimized based on the position estimation result of each UE 61 and the horizontal beam direction (S130).

Next, the horizontal-beam direction optimization step (S120) and the other antenna-parameter optimization process (S130) are repeated T times (T≥1).

In the parameter application step (S140), the updated final values of the antenna parameters of each cell in the area 20A after completing the horizontal beam direction optimization step (S120) and the other antenna parameter optimization process (S130) is applied as control setting values of SL antenna 211 in the communication relay station of the real environment.

Figure 9:
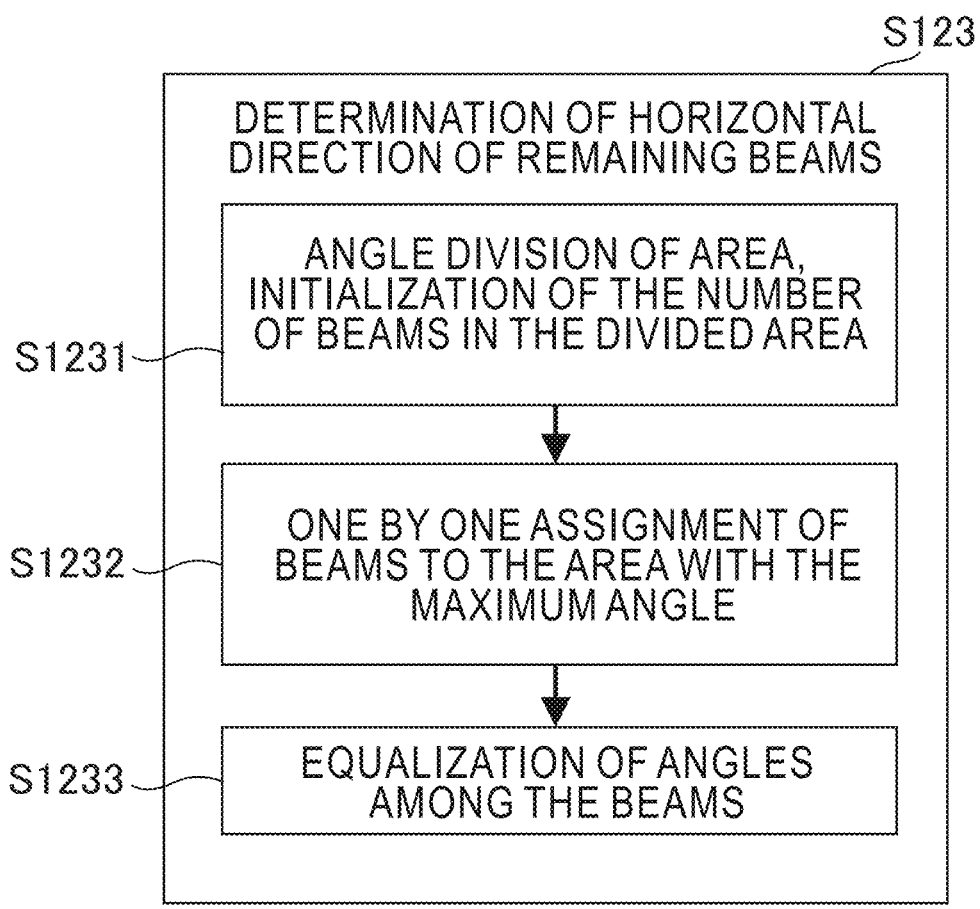
FIG. 9 is an illustration showing a specific example of determination process of remaining beam direction in the dynamic area control of FIG. 6.
Figure 10A:
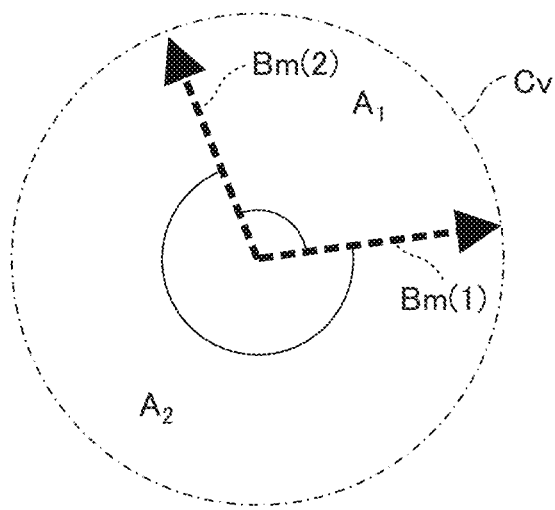
FIG. 10A is an illustration showing an example of area division and beam assignment in the determination process of remaining beam direction in FIG. 9.
Figure 10B:
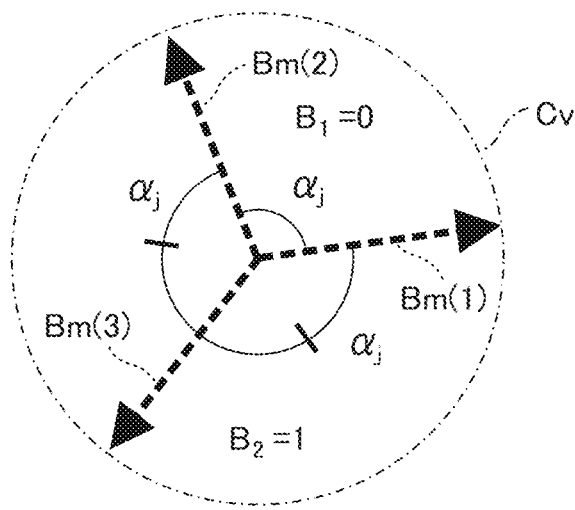
FIG. 10B is an illustration showing an example of area division and beam assignment in the determination process of remaining beam direction in FIG. 9.
Figure 10C:
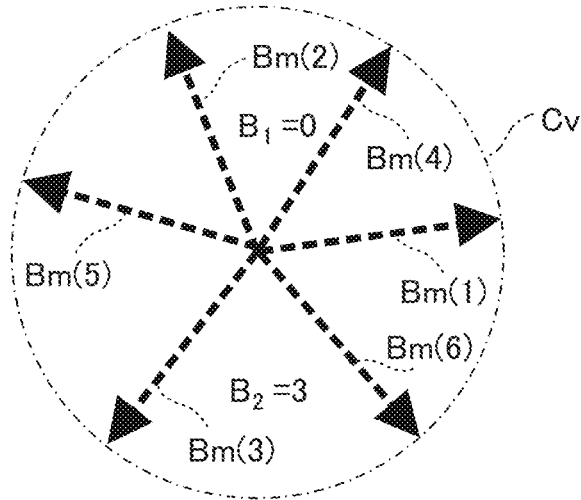
FIG. 10C is an illustration showing an example of area division and beam assignment in the determination process of remaining beam direction in FIG. 9.

FIG. 9 is an illustration showing a specific example of horizontal-direction determination process of the remaining beams (S123) in the dynamic area control of FIG. 6. Each of FIG. 10A to FIG. 10C is an illustration showing an example of area division and beam assignment in the horizontal-direction determination process of the remaining beams of FIG. 9. The horizontal directions of the remaining N-p beams may be determined, for example, as shown in FIG. 9 and FIG. 10A to FIG. 10C.

In FIG. 9, first, the following initializations (i) and (ii) are performed (S1231).

(i): The area is divided into p angular ranges $A_1$, $A_2$, ..., $A_p$ (A1+A2+ ... +Ap=360° by p (0≤p≤N) beams determined so as to direct to the p places of UE clusters. In the example of FIG. 10A, the area is divided into 2 angular ranges $A_1$ and $A_2$ by two beams Bm(1) and Bm(2) determined so as to direct to two places of UE clusters.

(ii): The number of beams included in each of the p angular ranges $A_1$, $A_2$, ..., $A_p$ is set to $B_1$, $B_2$, ..., $B_p$ (all initial values are 0).

Next, the following one-by-one assignment processes (iii) to (vi) of beams to the area with the maximum angle are performed (S1232).

(iii): For each of the p angular ranges $A_1$, $A_2$, ..., $A_p$, a division angle $\alpha_j$ (=$A_j/(B_j+1)$, j=1, 2, ..., p) is obtained by dividing the angular range $A_j$ by ($B_j+1$).

(iv): Area number n, which corresponds to the division angle is maximum among the division angles $\alpha_1$, $\alpha_2$, ..., $\alpha_p$, is obtained (n=argmax($\alpha_1$, $\alpha_2$, ..., $\alpha_p$).

(v): One beam among the remaining beams is assigned to the n-th division angle ($B_n$=$B_n$+1). In the example of FIG. 10B, since the division angle $\alpha_2$, which is obtained by dividing the angle range A2 by ($B_2$+1=2), is the maximum among the division angles $\alpha_1$ and $\alpha_2$, the area number n is 2, and one beam Bm(3) is assigned to the area A2.

(vi): The above-described (iii) to (v) are repeated until there is no remaining beam (until $B_1+B_2+...B_p$=N−p).

Then, as shown in the following (vii), the beam intervals are equalized and the process ends (S1233).

(vii): Each of the angle ranges $A_1$, $A_2$, ..., $A_p$ is equally divided by each of the number of beams $B_1$, $B_2$, ..., $B_p$ of the angle range, and the process ends. FIG. 10C shows the final state in which the equal division of the angular range is completed and the horizontal directions of the six beams Bm(1) to Bm(6) are determined.

Figure 11:
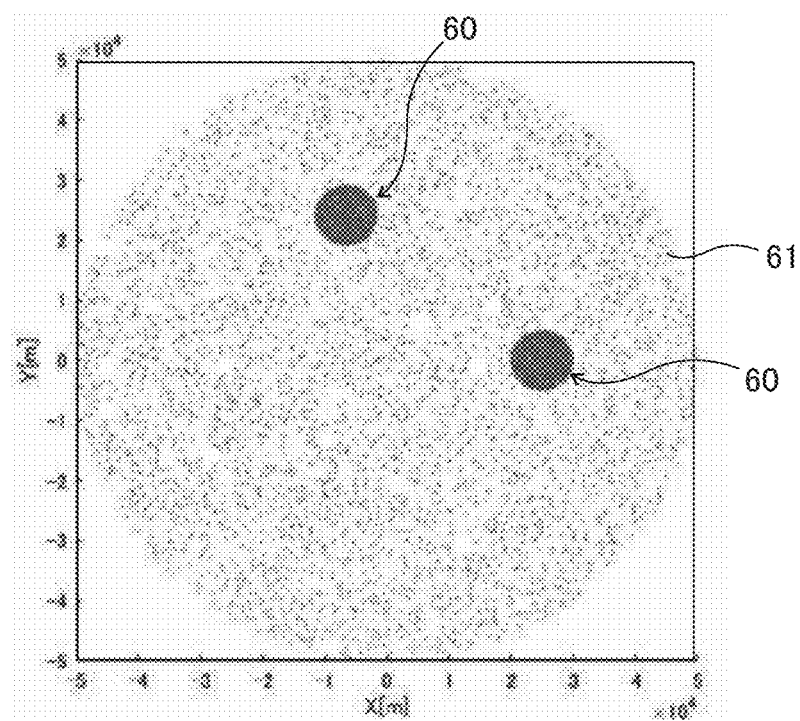
FIG. 11 is an illustration showing a specific example of plural occurrence positions of UE clusters in a service area.
Figure 12:
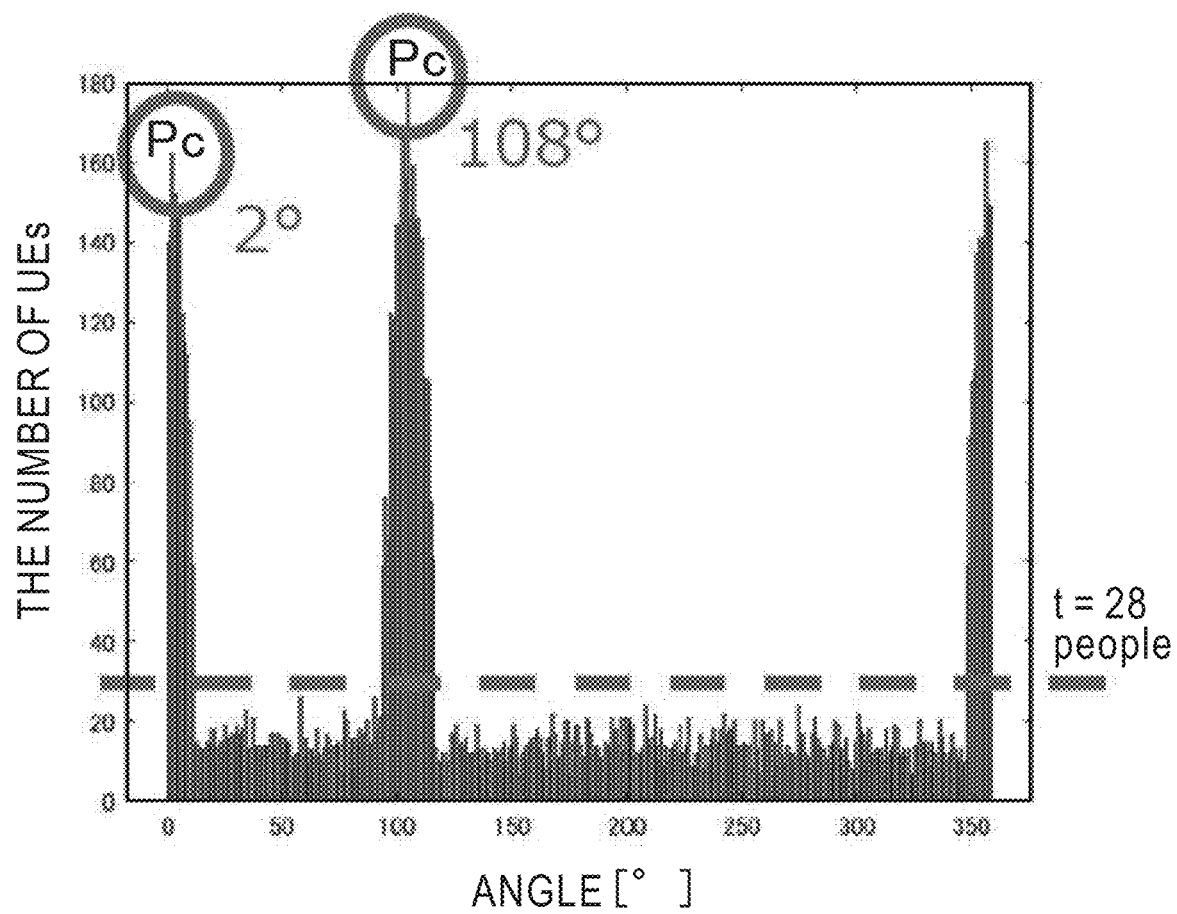
FIG. 12 is an illustration showing plural occurrence positions of UE clusters in a histogram of UEs regarding angles of the horizontal direction with reference to the center of FIG. 11.

FIG. 11 is an illustration showing a specific example of occurrence positions of plural UE clusters Pc in a service area. FIG. 12 is an illustration showing the occurrence positions of plural UE clusters in a histogram of UEs regarding horizontal angles with reference to the center of FIG. 11. The angle of the right direction in the horizontal direction with respect to the center of FIG. 11 is 0°, and the angle of counterclockwise direction is a positive angle. In FIG. 11, the number of cells is six, and the UE clusters 60 are disposed at angles of 0° and 105° in the horizontal direction.

In FIG. 12, a criterion that means there are many UEs (a threshold value t for judging the aforementioned UE cluster) is determined from the number of UEs in the entire angular range. In the example of FIG. 12, since it can be judged that there are many UEs if the number is twenty-eight persons or more, the threshold value t=28 [persons] is determined.

Next, the angle, at which the number of UEs in the angle range of each cell (angle range of 60° each in the illustrated example) is large (equal to or more than the threshold value t) and maximum, is estimated as the angle of UE cluster. In the example of FIG. 12, 2° in the angle range of −30° to +30° and 108° in the angle range of +90° to +150° are estimated as the angles of UE clusters.

FIG. 13A to FIG. 13F are illustrations showing an example of an assignment procedure of the remaining beams other than the beams directed to the occurrence positions of plural UE clusters in FIG. 11. FIG. 13A to FIG. 13F show an example in which the number of cells is six and the angle estimation results of the UE cluster directions are 2° and 108°.

Figure 13A:
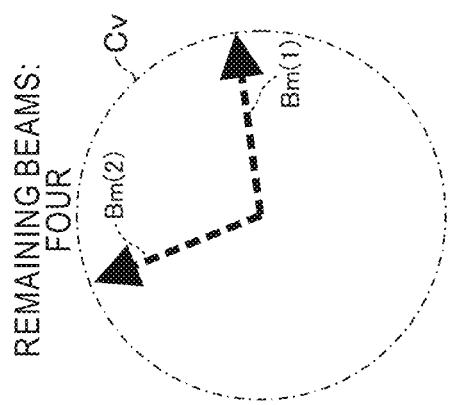
FIG. 13A is an illustration showing an example of an assignment procedure of the remaining beams other than the beams directed to the plural occurrence positions of the UE clusters in FIG. 11.

First, in FIG. 13A, two beams Bm(1) and Bm(2) among the six beams Bm(1) to Bm(6) formed by the SL antenna 211 are respectively directed to the two angular directions (2° and 108°) of the UE clusters.

Figure 13B:
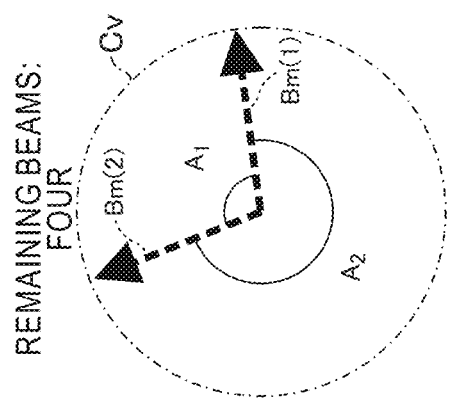
FIG. 13B is an illustration showing an example of an assignment procedure of the remaining beams other than the beams directed to the plural occurrence positions of the UE clusters in FIG. 11.

Next, in FIG. 13B, two angular ranges $A_1$ and $A_2$ are obtained by dividing a virtual circle Cv for beam assignment with the angular directions of UE clusters.

Figure 13C:
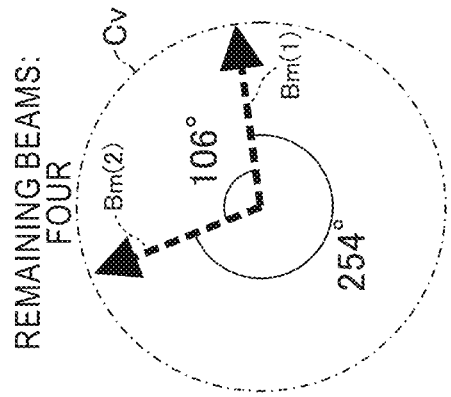
FIG. 13C is an illustration showing an example of an assignment procedure of the remaining beams other than the beams directed to the plural occurrence positions of the UE clusters in FIG. 11.

Next, in FIG. 13C, one beam is added in the direction of A2 based on A1<A2 in the result of comparison between the two angular ranges A1 and A2($A_1$:$A_2$=106°:254°).

Figure 13D:
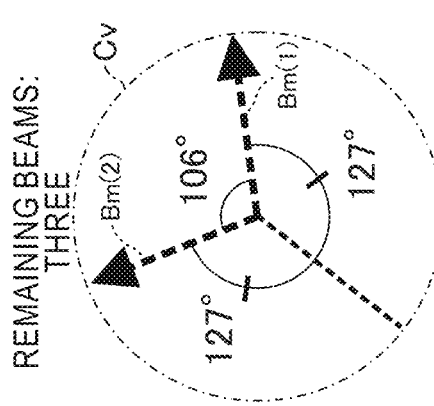
FIG. 13D is an illustration showing an example of an assignment procedure of the remaining beams other than the beams directed to the plural occurrence positions of the UE clusters in FIG. 11.

Next, in FIG. 13D, one more beam is added in the direction of $A_2$ based on $A_1$<$A_2$/2 in the result of comparison between the angle ranges $A_1$ and $A_2$/2($A_1$:$A_2$/2=106°:127°).

Figure 13E:
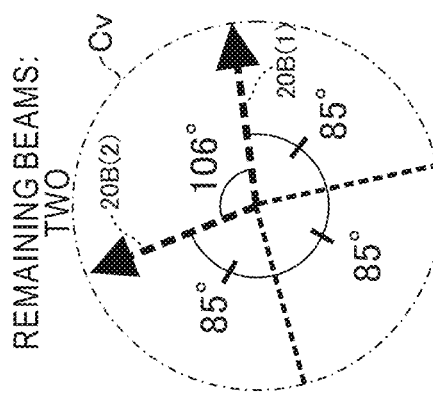
FIG. 13E is an illustration showing an example of an assignment procedure of the remaining beams other than the beams directed to the plural occurrence positions of the UE clusters in FIG. 11.

Next, in FIG. 13E, one beam is added in the direction of $A_1$ based on $A_1$>$A_2$/3 in the result of comparison between the angle ranges $A_1$ and $A_2$/3($A_1$:$A_2$/3=106°:85°).

Figure 13F:
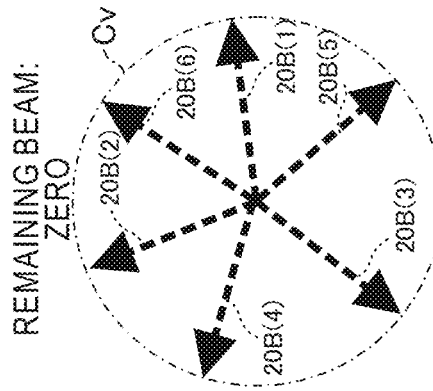
FIG. 13F is an illustration showing an example of an assignment procedure of the remaining beams other than the beams directed to the plural occurrence positions of the UE clusters in FIG. 11.

By continuing to add a beam in the same manner until the remaining beam become 0, the assignment and placement of the remaining four beams Bm(3) to Bm(6) can be determined as shown in FIG. 13F.

As described above, according to the present embodiment, it is possible to perform the dynamic area control capable of coping with a change of distribution of the UEs 61 in the service area 20A configured with the plural cells formed toward the ground, and to suppress an increase of time required for the area optimization.

It is noted that, the process steps and configuration elements of the relay communication station of the communication relay apparatus such as HAPS, the feeder station, the gateway station, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20: HAPS (communication relay apparatus)
20A: service area
20C: cell
20F: footprint
20S: subarea
21: relay communication station
60: UE high-density section
61: UE (terminal apparatus)
70: GW station
80: base station apparatus
90: mobile communication network
95: remote control apparatus
211: antenna for service link (SL antenna)
212: antenna for feeder link (FL antenna)

The invention claimed is:
1. An aerial-staying communication relay apparatus having a relay communication station for relaying radio com- munication of terminal apparatuses located in a plurality of N cells formed toward a service area on a ground, where N is an integer, and an antenna for service link, the communication relay apparatus comprising:

position estimation means for estimating positions of plural terminal apparatuses located in the service area;
  parameter optimization means for dividing a plurality of L kinds of antenna parameters of the antenna for service link into plural parameter groups, where L is an integer, and optimizing the antenna parameters based on estimation results of positions of the plural terminal apparatuses, for each of the parameter groups; and
  parameter application means for applying, to the antenna for service link, optimum values of the plurality of L kinds of antenna parameters after completing the optimization for each of the parameter groups, and wherein the parameter optimization means divides the plurality of L kinds of antenna parameters of the antenna for service link into a first parameter group including horizontal beam directions of a plurality of N beams forming the plurality of N cells and a second parameter group including one or more other kinds of antenna parameters other than the horizontal beam directions of the plurality of N beams, where N is an integer,
wherein the parameter optimization means:
  determines the horizontal beam directions of the plurality of N beams belonging to the first parameter group based on the estimation results of the positions of the plural terminal apparatuses; and
  determines optimum values of the one or more other kinds of antenna parameters belonging to the second parameter group based on the estimation results of the positions of the plural terminal apparatuses by a search-based algorithm,
  wherein the parameter optimization means determines the horizontal beam directions of the plurality of N beams so that a plurality of p beams, where p is an integer and p<N, among the plurality of N beams are disposed in the horizontal direction where the cluster of the terminal apparatus is occurred, and a remaining plurality of N-p beams are disposed so that spatial intervals in an angular range of the horizontal direction excluding the p beams become equal to each other.

2. The aerial-staying communication relay apparatus according to claim 1, wherein plural kinds of antenna parameters belonging to the second parameter group include a tilt angle, a horizontal beam width and a vertical beam width of each of the plurality of N beams.

3. The aerial-staying communication relay apparatus according to claim 2, wherein the parameter optimization means performs the parameter optimization repeatedly plural times (T times, where T is an integer).

4. The aerial-staying communication relay apparatus according to claim 3, wherein the communication relay apparatus performs the position estimation for the plural terminal apparatuses, the optimization for the antenna parameters and the application of the optimum values of the antenna parameters to the antenna for service link, periodically or when an amount of change in the distribution of the terminal apparatuses in the service area becomes larger than a predetermined amount of change.

5. The aerial-staying communication relay apparatus according to claim 2, wherein the communication relay apparatus performs the position estimation for the plural terminal apparatuses, the optimization for the antenna parameters and the application of the optimum values of the antenna parameters to the antenna for service link, periodically or when an amount of change in the distribution of the terminal apparatuses in the service area becomes larger than a predetermined amount of change.

6. The aerial-staying communication relay apparatus according to claim 1, wherein the parameter optimization means performs the parameter optimization repeatedly plural times (T times, where T is an integer).

7. The aerial-staying communication relay apparatus according to claim 1, wherein the communication relay apparatus performs the position estimation for the plural terminal apparatuses, the optimization for the antenna parameters and the application of the optimum values of the antenna parameters to the antenna for service link, periodically or when an amount of change in the distribution of the terminal apparatuses in the service area becomes larger than a predetermined amount of change.

8. A remote control apparatus capable of communicating with an aerial-staying type communication relay apparatus having a relay communication station for relaying radio communication of terminal apparatuses located in a plurality of N cells formed toward a service area on a ground, where N is an integer, and an antenna for service link, the remote control apparatus comprising:

position estimation means for estimating positions of plural terminal apparatuses located in the service area;
  parameter optimization means for dividing a plurality of L kinds of antenna parameters of the antenna for service link into plural parameter groups, where L is an integer, and optimizing the antenna parameters based on estimation results of positions of the plural terminal apparatuses, for each of the parameter groups; and
  parameter transmission means for transmitting, to the communication relay apparatus, optimum values of the plurality of L kinds of antenna parameters after completing the optimization for each of the parameter groups, and wherein the parameter optimization means divides the plurality of L kinds of antenna parameters of the antenna for service link into a first parameter group including horizontal beam directions of a plurality of N beams forming the plurality of N cells and a second parameter group including one or more other kinds of antenna parameters other than the horizontal beam directions of the plurality of N beams, where N is an integer, wherein the parameter optimization means:
  determines the horizontal beam directions of the plurality of N beams belonging to the first parameter group based on the estimation results of the positions of the plural terminal apparatuses; and
  determines optimum values of the one or more other kinds of antenna parameters belonging to the second parameter group based on the estimation results of the positions of the plural terminal apparatuses by a search-based algorithm, wherein the parameter optimization means determines the horizontal beam directions of the plurality of N beams so that a plurality of p beams, where p is an integer and p<N, among the plurality of N beams are disposed in the horizontal direction where the cluster of the terminal apparatus is occurred, and a remaining plurality of N-p beams are disposed so that spatial intervals in an angular range of the horizontal direction excluding the p beams become equal to each other.

9. The remote control apparatus according to claim 8, wherein plural kinds of antenna parameters belonging to the second parameter group include a tilt angle, a horizontal beam width and a vertical beam width of each of the plurality of N beams.

10. The remote control apparatus according to claim 9, wherein the parameter optimization means performs the parameter optimization repeatedly plural times (T times, where T is an integer).

11. The remote control apparatus according to claim 10, wherein the remote control apparatus performs the position estimation for the plural terminal apparatuses, the optimization for the antenna parameters and the application of the optimum values of the antenna parameters to the antenna for service link, periodically or when an amount of change in the distribution of the terminal apparatuses in the service area becomes larger than a predetermined amount of change.

12. The remote control apparatus according to claim 9, wherein the remote control apparatus performs the position estimation for the plural terminal apparatuses, the optimization for the antenna parameters and the application of the optimum values of the antenna parameters to the antenna for service link, periodically or when an amount of change in the distribution of the terminal apparatuses in the service area becomes larger than a predetermined amount of change.

13. The remote control apparatus according to claim 8, wherein the parameter optimization means performs the parameter optimization repeatedly plural times (T times, where T is an integer).

14. The remote control apparatus according to claim 8, wherein the remote control apparatus performs the position estimation for the plural terminal apparatuses, the optimization for the antenna parameters and the application of the optimum values of the antenna parameters to the antenna for service link, periodically or when an amount of change in the distribution of the terminal apparatuses in the service area becomes larger than a predetermined amount of change.

15. A system comprising: the remote control apparatus according to claim 8; and the aerial-staying communication relay apparatus according to claim 1.

16. An area control method for a service area configured with a plurality of N cells formed toward the ground from an aerial-staying type communication relay apparatus having an antenna for service link, the area control method including:
estimating positions of plural terminal apparatuses located in the service area;
dividing a plurality of L kinds of antenna parameters of the antenna for service link into plural parameter groups, and
optimizing the antenna parameters based on estimation results of positions of the plural terminal apparatuses, for each of the parameter groups;
applying, to the antenna for service link, optimum values of the a plurality of L kinds of antenna parameters after completing the optimization for each of the parameter groups;
dividing the a plurality of L kinds of antenna parameters of the antenna for service link into a first parameter group including horizontal beam directions of a plurality of N beams forming the plurality of N cells and a second parameter group including one or more other kinds of antenna parameters other than the horizontal beam directions of the plurality of N beams;
determining the horizontal beam directions of the plurality of N beams belonging to the first parameter group based on the estimation results of the positions of the plural terminal apparatuses;
determining optimum values of the one or more other kinds of antenna parameters belonging to the second parameter group based on the estimation results of the positions of the plural terminal apparatuses by a search-based algorithm; and
determining the horizontal beam directions of the plurality of N beams so that a plurality of p beams, where p is an integer and p<N, among the plurality of N beams are disposed in the horizontal direction where the cluster of the terminal apparatus is occurred, and a remaining plurality of beams are disposed so that spatial intervals in an angular range of the horizontal direction excluding the p beams become equal to each other.

17. A non-transitory computer readable medium containing software that is executed by a computer or processor provided in an aerial-staying type communication relay apparatus having a relay communication station for relaying radio communication of terminal apparatuses located in a plurality of N cells formed toward a service area on the ground and an antenna for service link, the software comprising:
executable code that estimates positions of plural terminal apparatuses located in the service area;
executable code that divides a plurality of L kinds of antenna parameters of the antenna for service link into plural parameter groups, and optimizes the antenna parameters based on estimation results of positions of the plural terminal apparatuses, for each of the parameter groups;
executable code that applies, to the antenna for service link, optimum values of the plurality of L kinds of antenna parameters after completing the optimization for each of the parameter groups;
executable code that divides the plurality of L kinds of antenna parameters of the antenna for service link into a first parameter group including horizontal beam directions of a plurality of N beams forming the plurality of N cells and a second parameter group including one or more other kinds of antenna parameters other than the horizontal beam directions of the plural (N) beams;
executable code that determines the horizontal beam directions of the plurality of N beams belonging to the first parameter group based on the estimation results of the positions of the plural terminal apparatuses; executable code that determines optimum values of the one or more other kinds of antenna parameters belonging to the second parameter group based on the estimation results of the positions of the plural terminal apparatuses by a search-based algorithm; and executable code that determines the horizontal beam directions of the plurality of N beams so that a plurality of p beams, where p is an integer and p<N, among the plurality of N beams are disposed in the horizontal direction where the cluster of the terminal apparatus is occurred, and a remaining plurality of N-p beams are disposed so that spatial intervals in an angular range of the horizontal direction excluding the p beams become equal to each other.

18. A non-transitory computer readable medium containing software that is executed by a computer or processor provided in a remote control apparatus capable of communicating with an aerial-staying type communication relay apparatus having a relay communication station for relaying radio communication of terminal apparatuses located in a plurality of N cells formed toward a service area on the ground and an antenna for service link, the software comprising:
executable code that estimates positions of plural terminal apparatuses located in the service area;

executable code that divides a plurality of L kinds of antenna parameters of the antenna for service link into plural parameter groups, and optimizes the antenna parameters based on estimation results of positions of the plural terminal apparatuses, for each of the parameter groups;

executable code that transmits, to the communication relay apparatus, optimum values of the plurality of L kinds of antenna parameters after completing the optimization for each of the parameter groups; executable code that divides the plurality of L kinds of antenna parameters of the antenna for service link into a first parameter group including horizontal beam directions of a plurality of N beams forming the plurality of N cells and a second parameter group including one or more other kinds of antenna parameters other than the horizontal beam directions of the plurality of N beams, executable code that determines the horizontal beam directions of the plurality of N beams belonging to the first parameter group based on the estimation results of the positions of the plural terminal apparatuses;

executable code that determines optimum values of the one or more other kinds of antenna parameters belonging to the second parameter group based on the estimation results of the positions of the plural terminal apparatuses by a search-based algorithm;

executable code that determines the horizontal beam directions of the plurality of N beams so that a plurality of p beams, where p is an integer and p<N, among the plurality of N beams are disposed in the horizontal direction where the cluster of the terminal apparatus is occurred, and a remaining plurality of N-p beams are disposed so that spatial intervals in an angular range of the horizontal direction excluding the p beams become equal to each other.

* * * * *